United States Patent [19]
Yokoyama et al.

[11] Patent Number: 6,023,592
[45] Date of Patent: Feb. 8, 2000

[54] CAMERA WITH MODULAR COMPONENTS

[75] Inventors: Kunio Yokoyama; Shinya Takahashi, both of Hino; Minoru Hara, Hachioji; Tatsuya Suzuki, Tokyo; Koji Kato, Tama, all of Japan

[73] Assignee: Olympus Optical Co., Ltd., Tokyo, Japan

[21] Appl. No.: 09/109,875

[22] Filed: Jul. 2, 1998

[30] Foreign Application Priority Data

Jul. 8, 1997 [JP] Japan .................................... 9-182483

[51] Int. Cl.$^7$ .................................................. G03B 17/02
[52] U.S. Cl. .......................................................... 396/541
[58] Field of Search ................................. 396/440, 535, 396/541

[56] References Cited

U.S. PATENT DOCUMENTS 5,623,711 4/1997 Misawa ............................... 396/535 X

FOREIGN PATENT DOCUMENTS 2-259631 10/1990 Japan .
08160516 6/1996 Japan .

Primary Examiner—Howard B. Blankenship
Attorney, Agent, or Firm—Louis Weinstein

[57] ABSTRACT

A camera body comprises a lens barrel unit, a spool chamber unit forming a spool chamber, a patrone chamber unit forming a patrone chamber, and a rail member that has an aperture that is provided so that a beam from the lens barrel unit can pass through and guide rails defining a position of film to the aperture, and is a connecting member that connects the spool chamber unit and patrone chamber unit, and has an approximately plate-like shape.

17 Claims, 3 Drawing Sheets

CAMERA WITH MODULAR COMPONENTS

BACKGROUND OF THE INVENTION

1. Field of the Invention

The present invention relates to a camera body, in particular, to a camera body of a camera taking a picture with using a photosensitive film.

2. Related Background Art

Until now, various body structures of cameras for taking pictures have been proposed, the cameras that are used for taking pictures with using photosensitive roll film and the like.

For example, a camera disclosed in Japanese Unexamined Patent Publication No. 8-160516 comprises: a camera body comprising a first block forming a patrone chamber and a second block forming a spool chamber; and a frame that is provided between the first and second blocks and comprises in the front a support supporting a picture-taking lens barrel, wherein guide rails for positioning of film are provided in the back of the frame.

Owing to this, even if an external force is added to the camera body, it is possible to repress deformation of guide rails, and to keep flange back size and flatness of a film plane that were adjusted in the production of the camera.

Nevertheless, according to a means disclosed in the Japanese Unexamined Patent Publication No. 8-160516, a part that is provided approximately in the center of the camera body and supports the picture-taking lens barrel in the front is formed in the rigid frame structure. Therefore, the structure is complicated, and this causes a decrease of productivity. Then, Japanese Unexamined Patent Publication No. 2-259631 and the like propose means for improving productivity.

In a camera disclosed in the Japanese Unexamined Patent Publication No. 2-259631, a unit forming a spool chamber, a unit where guide rails and an aperture forming a picture plane are provided, and a unit forming a patrone chamber are separately constructed. At the same time, these units are connected in to from one piece, and the unit where the guide rails and aperture are provided is formed with a lens mounting block and the like as one-piece.

Owing to this, since it is possible to perform engineering changes and the like for every unit, there are advantages that it is possible to reduce a design time accompanying with the engineering changes and the like at the time of a model change, and it is possible to satisfactorily complete these changes by performing small-scaled exchange of production equipment and the like that accompanies this change.

In addition, the unit where the guide rails and aperture are provided is formed as one-piece with the lens-mounting block supporting an optical system of the picture-taking lens. Therefore, it is possible to easily adjust mounting of the picture-taking lens, range finding, and the like by fixing the lens barrel with screws to this lens-mounting block, and hence it is possible to simplify the production process.

Nevertheless, according to the means disclosed in the Japanese Unexamined Patent Publication No. 2-259631, each box-shaped unit such as the unit forming the spool chamber and the unit forming the patrone chamber are connected and mounted to the unit where the guide rails and aperture are provided. Hence this has a problem that the size of the optical system of the picture-taking lens in the lens barrel is restricted in the radial direction while the size in the direction of the optical axis becomes large, and hence the camera itself becomes large.

In addition, objects of means disclosed in the Japanese Unexamined Patent Publications No. 8-160516 and No. 2-259631 are to apply them to single-lens reflex cameras and each picture-taking lens is mounted to the unit where the guide rails are provided. Therefore, high machining accuracy is required to secure optical performance. Hence, there is also a problem that the internal structure becomes complicated in order to secure the high accuracy.

SUMMARY OF THE INVENTION

An object of the present invention is to provide a camera body that is composed of respective constitutive units having simple structure, can flexibly correspond to engineering changes at the time of a model change and the like, contributes to increase of productivity, and has high accuracy and high stiffness.

In brief, a camera body according to the present invention comprises a lens barrel unit, a spool chamber unit forming a spool chamber, a patrone chamber unit forming a patrone chamber, and a connecting member that has an aperture that is provided so that a beam from the lens barrel unit can pass through and guide rails defining a position of film to this aperture, connects the spool chamber and patrone chamber, and has an approximately plate-like shape.

The above and further objects and advantage of the present invention will appear more fully from the following detailed description.

According to the present invention, since each constitutive unit constructing the camera body is formed in a simple shape, it is possible to flexibly correspond to engineering changes and the like at the time of a model change and the like. Therefore, it is possible to contribute increase of productivity while it is possible to provide a camera body having high accuracy and high stiffness by reinforcing connection of respective constitutive units with using approximately a plate-like reinforcing member.

DETAILED DESCRIPTION OF THE PREFERRED EMBODIMENTS

Figure 1:
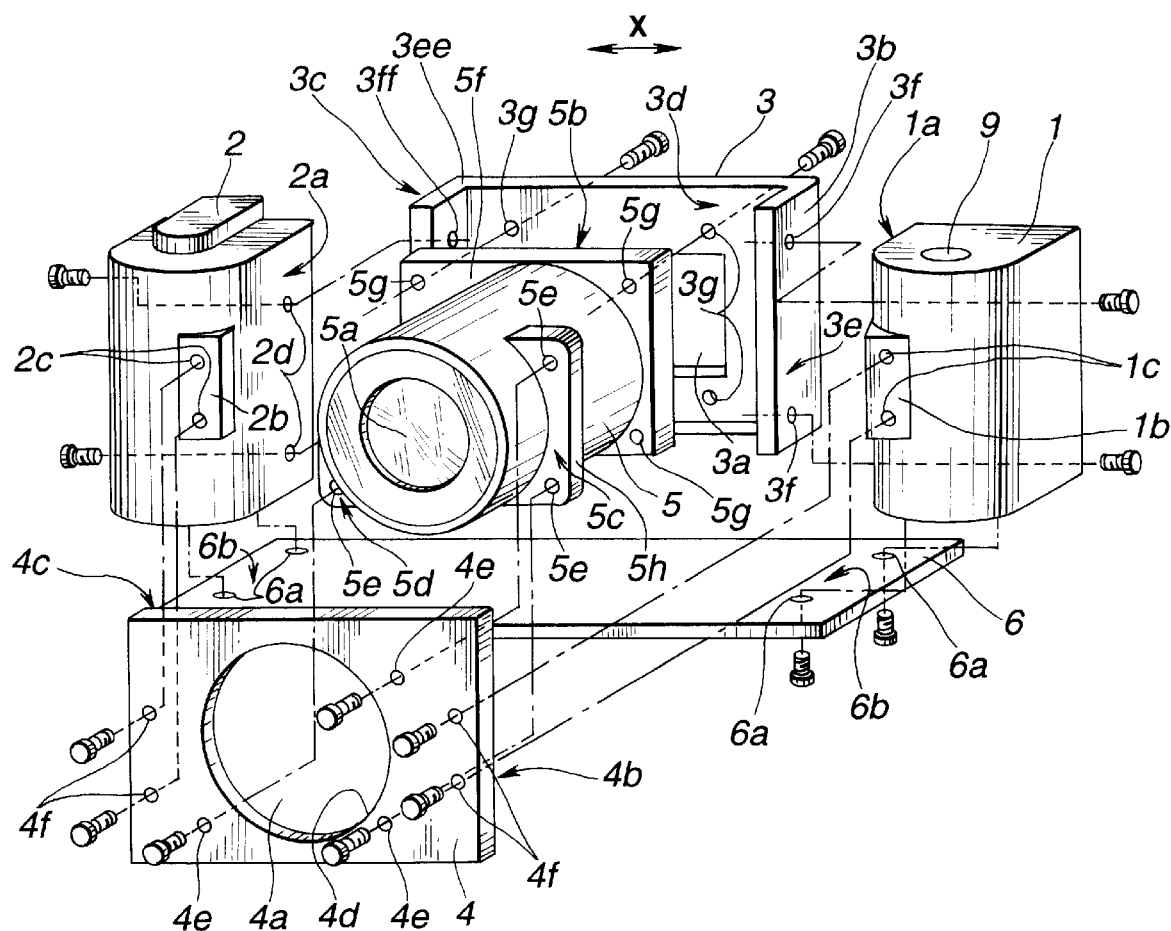
FIG. 1 is an exploded perspective view showing a camera body of an embodiment according to the present invention.

A camera body of this embodiment comprises a spool chamber unit 1 forming a spool chamber where a spool shaft 9 winding a roll film having been used for picture-taking is rotatably provided, a patrone chamber unit 2 forming a patrone chamber where a film patrone (not shown) where a roll of photosensitive film which is not yet used for picture-taking is wound and contained is loaded, a rail member 3 that has an aperture 3a and guide rails (not shown) and is a connecting member (a first connecting member) that connects the spool chamber unit 1, the patrone chamber unit 2, and a lens barrel unit 5 and has an approximately plate-like shape, the lens barrel unit 5 having a picture-taking lens 5a and the like therein, a connection reinforcing member 4 that reinforces connection of the respective constitutive units from the front of the camera body and is a connecting member (a second connecting member) having an approximately plate-like shape, and a lower connection reinforcing member 6 that reinforces connection of the respective constitutive units from the bottom of the camera body and is a connecting member (a third connecting member) having an approximately plate-like shape.

The rail member 3 has at least the aperture 3a, which is located in the approximate center, and the guide rails provided in the back, and the aperture 3a forms an image plane by enabling a beam from the lens barrel unit 5 pass. Furthermore, the guide rails secures the flatness of the film by pressing both edges in the width direction of the roll film with a pressure plate (not shown) and the like that is located on a rear lid (not shown) while the guide rails define the position of the film to the aperture 3a.

An opening 4a having the shape and size approximately similar to the outer diameter of the lens barrel unit 5 is provided in the approximate center of the connection reinforcing member 4. Furthermore, three through-holes 4e for mounting the lens barrel unit are provided at predetermined positions of the circumference of this opening 4a. In addition, two through-holes 4f for being mounted to the spool chamber unit 1 and patrone chamber unit 2 are provided in both edge portions of the connection reinforcing member 4 respectively.

The lens barrel unit 5 is formed in the shape of a cylinder, and has the picture-taking lens and the like, as described above. Furthermore, ribs 5h where screw holes 5e corresponding to the through-holes 4e are provided at predetermined positions are provided as one-piece in the middle of both sides on the circumference of the lens barrel unit 5.

In addition, a lens barrel mounting plate 5f having an approximate plate-like shape is attached in a one-piece manner to the rear edge of the lens barrel unit 5. An opening (not shown) having the shape and size approximately similar to the outer diameter of the lens barrel unit 5 is provided in the approximately center of this lens barrel mounting plate 5f. Furthermore, four screw holes 5g (FIG. 1 shows three screw holes) for attaching the rail member are provided in four corners of the lens barrel mounting plate 5f.

Moreover, the ribs 5h and lens barrel mounting plate 5f of the lens barrel unit 5 can be formed with the lens barrel unit 5 as one-piece, or can be bonded at predetermined positions of the lens barrel unit 5 with adhesive means such as adhesive after being formed separately from the lens barrel unit 5.

In addition, the ribs 5h and lens barrel mounting plate 5f of the lens barrel unit 5 are provided so that they may be approximately orthogonal to an optical axis 5x (see FIG. 2) of the picture-taking lens 5a.

The rail member 3 has bent portions 3e and 3ee formed by both edge portions in the longitudinal direction being orthogonally bent toward the front. Two through-holes 3f for mounting the spool chamber unit are drilled in one bent portion 3e, and two through-holes 3ff for mounting the patrone chamber unit are drilled in another bent portion 3ee.

Furthermore, as described above, the aperture 3a is provided in the approximate center of the rail member 3, and the aperture 3a forms the image plane. Four through-holes 3g are drilled at the positions that are in the rim portion of this aperture 3a and faces the screw holes 5g of the lens barrel mounting plate 5f when the lens barrel mounting plate 5f of the lens barrel unit 5 is connected to the rail member 3 (FIG. 1 shows only three through-holes).

On the one hand, a connection block 1b that has two screw holes 1c facing the through-holes 4f and is used for connecting spool chamber unit 1 to the connection reinforcing member 4 is provided in the front, that is, the lens barrel unit side of the spool chamber unit 1.

In addition, two screw holes (not shown) for connecting spool chamber unit 1 to the rail member 3 are provided in the inner side, that is, the lens barrel unit side of the spool chamber unit 1. Furthermore, two screw holes (not shown) for holding spool chamber unit 1 on the lower connecting member 6 are provided in the bottom.

On the other hand, a connection block 2b where, similar to the spool chamber unit 1, two screw holes 2c that face the through-holes 4f and are used for connecting the patrone chamber unit 2 to the connection reinforcing member 4 are provided in the front, that is, the lens barrel unit side of the patrone chamber unit 2 is provided on the patrone chamber unit 2. Furthermore, two screw holes 2d for connecting this patrone chamber unit 2 to the rail member 3 are provided in the inner side, that is, the lens barrel unit side of the patrone chamber unit 2. Moreover, two screw holes (not shown) for holding patrone chamber unit 2 on the lower connecting member 6 are provided in the bottom.

In addition, four through-holes 6a are drilled at positions facing respectively the screw holes (not shown) provided in the bottoms of the spool chamber unit 1 and the patrone chamber unit 2, in the left and right edge portions of the lower connecting member 6.

The camera body of this embodiment is assembled by connecting the respective constitutive units formed like this to each other.

Thus, the opening 4a of the connection reinforcing member 4 receives the lens barrel unit 5 from the front side of the lens barrel unit 5, and a contact surface 4d of the back of the connection reinforcing member 4 coatacts surfaces 5c and 5d, that is, the front sides of the ribs 5h of the lens barrel unit 5. Then, three through-holes 4e in the side toward the connection reinforcing member 4 are made to coincide with three screw holes 5e in the ribs 5h to fix the connection reinforcing member 4 to the lens barrel unit 5 with screws.

Since the front surfaces of the ribs 5h, as described above, are approximately orthogonal to the optical axis 5x (see FIG. 2) of the picture-taking lens 5a, the connection reinforcing member 4 contacting the contact surfaces 5c and 5d of the ribs 5h is also connected approximately orthogonally to the optical axis 5x of the picture-taking lens 5a.

In addition, a contact surface 5b of the back of the lens barrel mounting plate 5f is made to contact a contact surface 3d of the circumference of the aperture 3a in the rail member 3. Then, four screw holes 5g in the side toward the lens barrel mounting plate 5f are made to coincide with four through-holes 3g of the rail member 3 to fix the lens barrel unit 5 to the rail member 3 with screws from the back.

Similar to the ribs 5h, the lens barrel mounting plate 5f is also formed approximately orthogonally to the optical axis 5x of the picture-taking lens 5a. Hence the rail member 3 contacting the contact surface 5b of the lens barrel mounting plate 5f is also connected approximately orthogonally to the optical axis 5x of the picture-taking lens 5a.

The spool chamber unit 1 is connected to the bent portion 3e of the rail member 3. Thus, a contact surface 3b of the bent portion 3e is made to contact to a contact surface 1a that is the inner side of the spool chamber unit 1. Then, two through-holes 3f in the bent portion 3e are made to coincide with two screw holes (not shown) in the spool chamber unit 1 to fasten the spool chamber unit 1 and the rail member 3 with screws from the inside of the rail member 3.

The bent portion 3e, as described above, is bent orthogonally to the rail member 3 toward the front. Thus, the contact surface 3b of the bent portion 3e is nearly parallel to the optical axis 5x of the picture-taking lens 5a, and is formed orthogonally to the film advancing direction (the direction X shown by the arrow in FIG. 1). Therefore, the spool chamber unit 1 contacting the contact surface 3b of the bent portion 3e is connected so that its contact surface 1a may be nearly parallel to the optical axis 5x of the picture-taking lens 5a, and orthogonal to the film advancing direction X.

Further, in this time, a contact surface of the connection block 1b of the spool chamber unit 1 contacts the contact surface 4b of the connection reinforcing member 4, and two screw holes 1c of the connection block 1b coincide with two through-holes 4f of the connection reinforcing member 4. In this condition, the connection-reinforcing member 4 and the spool chamber unit 1 are fastened with screws from the front.

The connection reinforcing member 4, as described above, is located so that the member 4 may be approximately orthogonal to the optical axis 5x of the picture-taking lens 5a, and similarly, the contact surface of the connection block 1b of the spool chamber unit 1 is also approximately orthogonal to the optical axis 5x of the picture-taking lens 5a. Therefore, the spool chamber unit 1 is located approximately orthogonally to the optical axis 5x of the picture-taking lens 5a.

In addition, the patrone chamber unit 2 is connected to another bent portion 3ee of the rail member 3. Thus, a contact surface 3c of the bent portion 3ee is made to contact a contact surface 2a that is an inner side of the patrone chamber unit 2. Then, two through-holes 3ff in the bent portion 3ee are made to coincide with two screw holes 2d in the patrone chamber unit 2 to fasten the patrone chamber unit 2 and the rail member 3 with screws from the inside of the rail member 3.

As described above, the bent portion 3ee, similar to the bent portion 3e, is bent orthogonally to the rail member 3 toward the front. Thus, the contact surface 3c of the bent portion 3e and the contact surface 2a of the patrone chamber unit 2 that contacts surface 3c are nearly parallel to the optical axis 5x of the picture-taking lens 5a, and are formed orthogonally to the film advancing direction X. Therefore, the patrone chamber unit 2 is located in approximate parallel with the optical axis 5x of the picture-taking lens 5a, and orthogonally to the film advancing direction X.

Further, in this time, a contact surface 2b of a connection block of the patrone chamber unit 2 contacts the contact surface 4c of the back of the connection reinforcing member 4, and two screw holes 2c of the connection block coincides with two through-holes 4f of the connection reinforcing member 4. In this condition, the connection-reinforcing member 4 and the patrone chamber unit 2 are fastened with screws from the front.

The connection reinforcing member 4, as described above, is located so that the member 4 may be approximately orthogonal to the optical axis 5x of the picture-taking lens 5a, and similarly, the contact surface 2b of the patrone chamber unit 2 is also approximately orthogonal to the optical axis 5x of the picture-taking lens 5a. Therefore, the patrone chamber unit 2 is located approximately orthogonally to the optical axis 5x of the picture-taking lens 5a.

In this manner, the lens barrel unit 5, rail member 3, spool chamber unit 1, patrone chamber unit 2, and connection reinforcing member 4 that are connected to each other in a one-piece manner are held on the lower connecting member 6. In this case, the bottoms of the spool chamber unit 1 and patrone chamber unit 2 are made to respectively contact a contact surface 6b that is the upper surface of the lower connecting member 6. In this condition, two screw holes in the bottom of the spool chamber unit 1 and two screw holes in the bottom of the patrone chamber unit 2 are made to coincide with four through-holes 6a in the lower connecting member 6 respectively, and the spool chamber unit 1 and patrone chamber unit 2 are fastened on the lower connecting member 6 with screws from the bottom.

As described above, according to this embodiment, assembly is completed only by connecting constitutive units, which are composed of constitutive members having simple shapes, with screws. Therefore, it is possible to contribute to increase of productivity of cameras, and to facilitate correspondence to model changes by utilizing commonality of respective members.

For example, if it becomes necessary to change a space between the spool chamber and patrone chamber at the time of a model change, it is possible to cope with it only by engineering changes of the rail member 3, connection reinforcing member 4, and lower connecting member 6.

In addition, since the rail member 3, connection reinforcing member 4, and lower connecting member 6 are formed with members having simple, approximately plate-like shapes, it is possible to contribute to the increase of productivity per part, and also to reduction of the production cost.

Furthermore, it is possible to easily secure the stiffness of an entire camera body, and also to construct the camera body that is not affected by external force added to internal mechanisms.

Moreover, since it is possible to check and adjust the picture-taking optical system in the condition that the lens barrel unit 5 holding the picture-taking lens 5a is connected to the rail member 3, this is advantageous to quality assurance, transportation, and the like.

In addition, respective plane contact surfaces having predetermined areas are provided in the connection parts between constitutive units and the connection parts between the connection reinforcing member 4 and lower connecting member 6 and the respective constitutive units. Furthermore, these contact surfaces are made to contact each other. In this condition, they are fastened with screws, and hence it is possible to further stably connect respective constitutive members to each other.

Moreover, since the rail member 3 and lens barrel unit 5 are made to contact the contact surfaces 3d and 5d respectively and are fastened with screws, it is possible to stably secure the positioning of the rail member 3 to the optical axis 5x of the picture-taking lens 5a. Owing to this, it is possible to satisfactorily keep the positional relation between an image-forming plane of a subject image provided by the picture-taking lens and the guide rails (not shown) of the rail member 3, and hence it is possible to locate a film plane in approximate parallel with the image-forming plane.

In addition, the connection reinforcing member 4 and spool chamber unit 1 contact and are fastened on the contact surfaces 4b and 1b respectively with screws, and the rail member 3 and spool chamber unit 1 do the contact surfaces 3b and 1a with screws. Therefore, it is possible that the rail member 3 securely receives film tension generated between the spool chamber and patrone chamber at the time of film winding and rewinding, and hence it is possible to contribute to keeping flatness of the film plane. Furthermore, it is possible to absorb size errors in the direction of the optical axis 5x between the contact surfaces 5c and 5d of the ribs 5h of the lens barrel unit 5 and the contact surface 5b of the lens barrel mounting plate 5f without distortion.

In addition, the connection-reinforcing member 4 can be also used for connecting to other constitutive units of a camera such as an exterior member. In this case, it is possible to easily keep positional accuracy between the constitutive unit such as the exterior member and respective constitutive units of the camera body, that is, the lens barrel unit 5, spool chamber unit 1, and patrone chamber unit 2, in high precision.

Furthermore, since the exterior member and the like and respective constitutive units (in particular, the rail member 3) of the camera body are not directly connected, the possibility is extremely small for external force added to the exterior member and the like to affect the rail member 3. Therefore, it is to facilitate prevention of distortion of the guide rails.

On the other hand, the lower connecting member 6 can be used as a supporting member supporting a driving force transmission mechanism (not shown).

In addition, the lower connecting member 6 can be constructed so that it may be located in the upper side of the camera body. In this case, it is possible for the lower connecting member 6 to also serve as a bottom plate and the like of a finder unit and an AF unit, and it is also possible to utilize the lower connecting member 6 as a mounting pedestal for locating these respective constitutive units.

In the camera body of this embodiment, the following means can be used for connecting the spool chamber unit 1 and rail member 3 and connecting the patrone chamber unit 2 and rail member 3.

Figure 3:
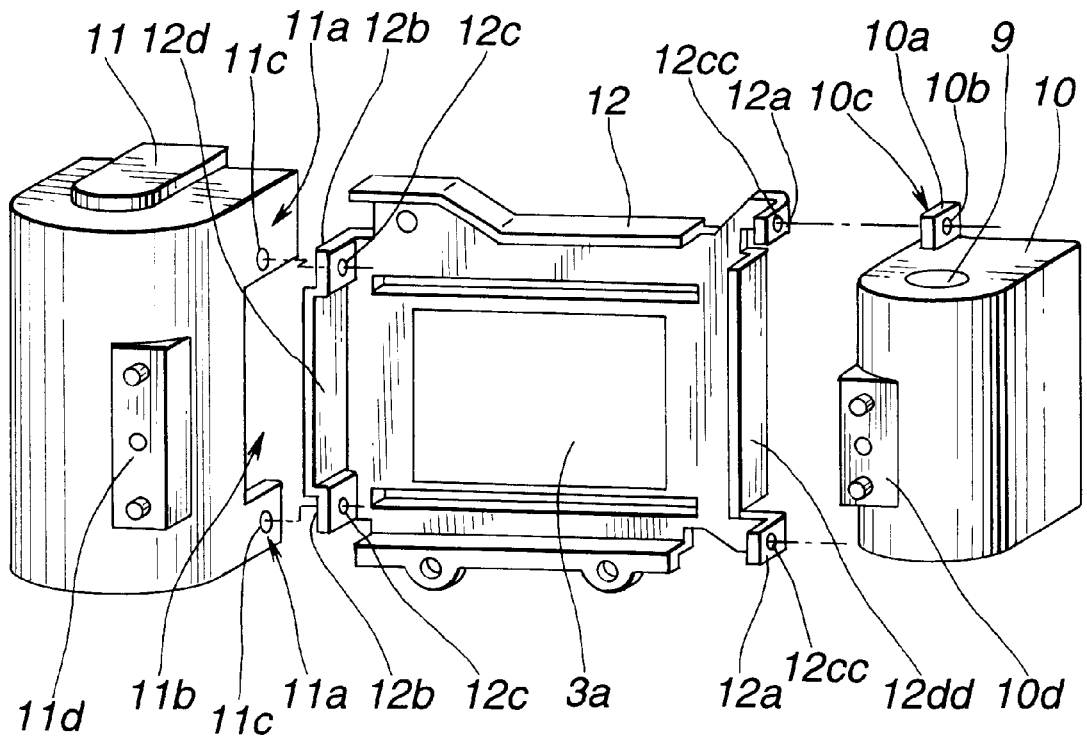
FIG. 3 is an exploded perspective view of a main part showing only a rail member, a spool chamber unit, and a patrone chamber unit in a modified example of the embodiment according to the present invention.

Thus, FIG. 3 is an exploded perspective view of a main part showing only the rail member, spool chamber unit, and patrone chamber unit in a modified example of the above-described embodiment.

As shown in FIG. 3, a spool chamber unit 10 and a patrone chamber unit 11 among constitutive units constructing a camera body of this modified example are formed in shapes approximately similar to those of the spool chamber unit 1 and patrone chamber unit 2 in the camera body of the above-described embodiment.

A cutout portion 11b into which a connecting portion 12d of a rail member 12 fits is provided at a position, which is in an inner side of the patrone chamber unit 11 and corresponds to the contact surface 2a that is an inner side of the patrone chamber unit 2 in the above-described embodiment, that is, a position that is near to the rear of the patrone chamber unit 11 and in the approximate center of the unit 11 in the vertical direction.

In the vicinity of the upper and lower parts of this cutout portion 11b, two screw holes 11c for connecting the patrone chamber unit 11 to the rail member 12 are provided, and two through-holes 12c are drilled in the side of the rail member 12 facing two screw holes 11c.

In the edge portion of the rail member 12 near to the patrone chamber unit, a bent portion having a contact surface 12b contacting to the patrone chamber unit 11, two through-holes 12c provided in this contact surface 12b, and the connecting portion 12d formed with providing steps toward the outside from the contact surfaces 12b is formed in approximate parallel to the optical axis 5x (see FIG. 2) of the picture-taking lens 5 and nearly orthogonally to the film advancing direction X (see FIG. 1).

Owing to this, when the connecting portion 12d of the rail member 12 is fitted into the cutout portion 11b of the patrone chamber unit 2, a contact surface 11a having the screw holes 11c and the contact surface 12b having the through-holes 12c contact each other, two screw holes 11c and two through-holes 12b coincide with each other. In this condition, the patrone chamber unit 11 is fastened on a side edge portion of the rail member 12 with screws from the inside of the rail member 12.

As described above, the bent portion having the contact surface 12b and connecting portion 12d in the rail member 12 is formed in approximate parallel to the optical axis 5x (see FIG. 1) of the picture-taking lens 5a (FIG. 1) and orthogonally to the film advancing direction X (see FIG. 1). Therefore, the patrone chamber unit 11 is located in approximate parallel to the optical axis 5x of the picture-taking lens 5a and orthogonally to the film advancing direction X.

On the other hand, in the upper and lower surfaces of the spool chamber unit 10, each projecting portion 10a having a screw hole 10b for connecting this spool chamber unit 10 to the rail member 12 is provided, and a contact surface of each projecting portion 10a is located facing the rail member 12.

In addition, in the upper and lower parts of the edge portion of the rail member 12 that faces the spool chamber unit, each first bent portion 12a having a contact surface contacting a contact surface 10c of the projecting portion 10a on the spool chamber unit 10 is provided. Furthermore, each through-hole 12cc is provided in each first bent portion 12a.

Moreover, between the two first bent portions 12a, a second bent portion 12dd that is bent forward unevenly with (i.e., displaced from) the first bent portions is formed.

In addition, the first and second bent portions 12a and 12dd are formed with another edge portion of the rail member 12 being bent forward so that they may be nearly parallel to the optical axis 5x (see FIG. 2) of the picture-taking lens 5a and orthogonal to the film advancing direction X (see FIG. 1).

Owing to this, when the second bent portion 12dd of the rail member 12 is fitted into a cutout portion (not shown) of the spool chamber unit 10, contact surfaces 10c of the projecting portions 10a and contact surfaces of the first bent portions 12a of the rail member 12 contact each other, two screw holes 10b of two projecting portions 10a and two through-holes 12cc coincide with each other. In this condition, the spool chamber unit 10 is fastened on another side edge portion of the rail member 12 with screws from the inside of the rail member 12.

As described above, the contact surface of the first bent portion 12a and the second bent portion 12dd in the rail member 12 is formed in approximate parallel to the optical axis 5x (see FIG. 2) of the picture-taking lens 5a and orthogonally to the film advancing direction X (see FIG. 1). Therefore, the spool chamber unit 10 is located in approximate parallel to the optical axis 5x (see FIG. 2) of the picture-taking lens 5a and orthogonally to the film advancing direction X (see FIG. 1).

Furthermore, connecting portions 10d and 11d are provided at positions that are in the middle of the front sides of the spool chamber unit 10 and patrone chamber unit 11 and near to the rail member. Moreover, two projections and one fitting hole are provided respectively in these connecting portions 10d and 11d. In contact surfaces of the connection reinforcing member 4 (see FIG. 1) that face to these projections and fitting hole, two fitting holes and one projection are provided, and owing to this, the connection reinforcing member 4, spool chamber unit 10, and patrone chamber unit 11 are connected. Other construction is approximately similar to that in the above-described embodiment.

According to the above-described modified example constructed like this, it is possible to gain effects similar to those in the above-described embodiment.

Furthermore, by providing the projecting portions 10a, which have contact surfaces 10a contacting the rail member 12, on the upper and lower surfaces of the spool chamber unit 10, it becomes possible to easily attach the spool chamber unit 10, where the spool shaft and the like are assembled, to the rail member 12 and to contribute to the increase of productivity.

In addition, it is usual that the spool chamber unit 10 is lower than the patrone chamber unit 11. Therefore, it does not affect the overall height of a camera body to provide the projecting portions 10a so that the projecting portions 10a may project from the upper and lower surfaces of the spool chamber unit 10.

Furthermore, the patrone chamber unit 11 and rail member 12 are fastened by providing the contact surfaces 11a, contacting the rail member 12, in the side of the patrone chamber unit 11 that is taller than the spool chamber unit 10. Hence, it is possible to make them connected without affecting the overall height of the camera body.

Therefore, it is possible to contribute to increase of the stiffness of the entire camera with members having simple shapes without increasing the size of the camera itself.

Moreover, the following means can be used as a connection means between the spool chamber unit and rail member of the camera body in the above-described embodiment and its modified example.

Figure 4:
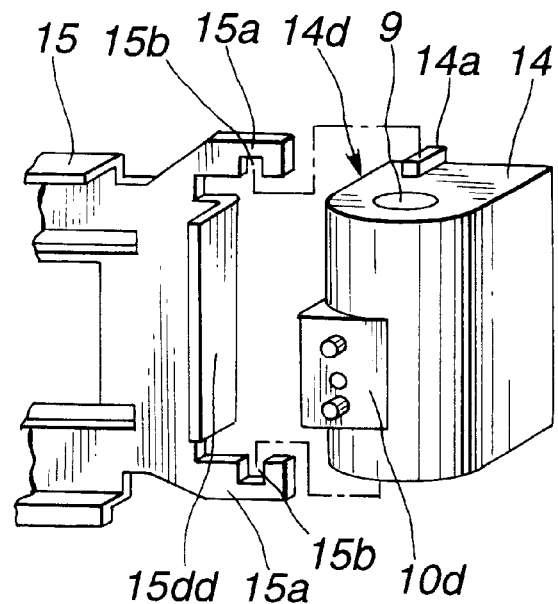
FIG. 4 is an exploded perspective view of a main part showing only part of a rail member, and a spool chamber unit in another modified example of the embodiment according to the present invention.

Thus, FIG. 4 is an exploded perspective view of a main part showing only part of a rail member, and a spool chamber unit in another modified example of the embodiment.

As shown in FIG. 4, in this modified example, projecting portions 14a are provided on the upper and lower surfaces of the spool chamber unit 14 instead of the projecting portions 10a of the spool chamber unit 10 in the above-described modified example. Each projecting portion 14a is formed in the shape of a rectangle having long sides in the direction of the optical axis 5x (see FIG. 2) of the picture-taking lens 5a.

In addition, engaging arms 15a having engaging slots 15b engaging with the projecting portions 14a of the spool chamber unit 14 are provided in the upper and lower edges of the rail member 15 instead of the first bent portions 12a of the rail member 12 in the above-described modified example.

Figure 2:
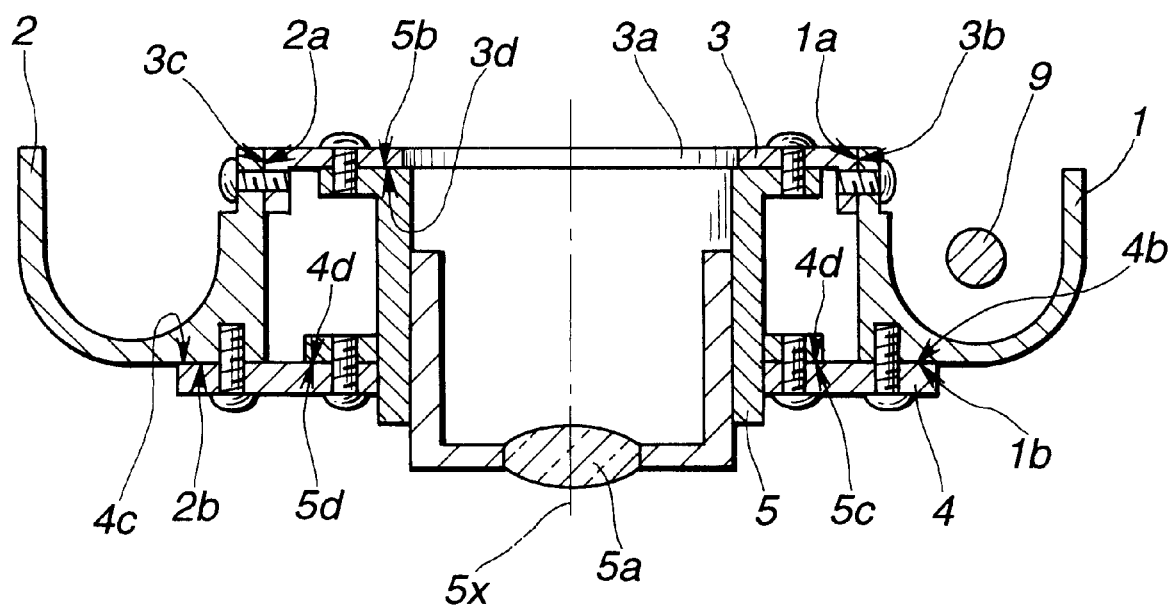
FIG. 2 is a horizontal sectional diagram of the approximate center at the camera body in FIG. 1.

Owing to this, in the condition that a contact surface 14d of the spool chamber unit 14 and a contact surface of a second bent portion 15dd of the rail member 15 are made to contact each other, the spool chamber unit 14 is slid along the optical axis 5x (see FIG. 2). Then, the projecting portions 14a of the spool chamber unit 14 are engaged with the engaging slots 15b of the engaging arms 15a. Therefore, they are connected so that it may be possible to bear the external force vertical to the optical axis 5x of the picture-taking lens 5a.

Furthermore, the spool chamber unit 14 is positionally restricted in the direction of the optical axis 5x (see FIG. 2) by being fastened to the connection reinforcing member 4 (see FIG. 1). It is assumed that other construction is approximately similar to that in the above-described modified example.

Owing to a construction like this, in the above-described other example, it is also possible to gain effects similar to those in the above-described embodiment and its modified example.

Moreover, since screwing is not adopted as a means for connecting the spool chamber unit 14 and rail member 15, with the difference from the above-described embodiments, the assembly process can be further simplified.

In the present invention, it is apparent that working modes different in a wide range can be formed on the basis of the present invention without departing from the spirit and scope of the present invention. The present invention is not restricted by any specific embodiment except may be limited by the appended claims.

What is claimed is:

1. A camera body formed of separate and independent components including:

a lens barrel unit;

a spool chamber unit forming a spool chamber;

a patrone chamber unit forming a patrone chamber; and a connecting member that has an aperture that is aligned with said lens barrel so that a beam from said lens barrel unit can pass therethrough and guide rails defining a position of film to said aperture, connects said spool chamber unit and said patrone chamber unit, and has an approximately plate-like shape; fastening means are provided for fixedly securing the connecting member to each of the spool chamber, patrone chamber and lens barrel units to form a unified camera body.

2. The camera body according to claim 1, wherein contact surfaces that are nearly parallel to an optical axis of a lens in said lens barrel unit are formed respectively in said spool chamber unit, said patrone chamber unit, and said connecting member.

3. A camera body formed of separate and independent components including:

a lens barrel unit;

a spool chamber unit forming a spool chamber;

a patrone chamber unit forming a patrone chamber;

a first connecting member that has an aperture that is aligned with the lens barrel unit so that a beam from said lens barrel unit can pass through and guide rails defining a position of film to said aperture, connects said spool chamber unit and said patrone chamber unit, and has an approximately plate-like shape; and a second connecting member spaced from said first connecting member and is positioned nearer to a front end of said camera than said first connecting member and connects said spool chamber unit and said patrone chamber unit; fastening means are provided for fixedly securing the second connecting member to each of the spool chamber, patrone chamber and lens barrel units to form a unified camera body.

4. The camera body according to claim 3, wherein said lens barrel unit is fixed to said first connecting member.

5. The camera body according to claim 3, wherein said lens barrel unit is fixed to said first connecting member and said second connecting member.

6. A camera body formed of separate and independent components including:

a lens barrel unit;

a spool chamber unit forming a spool chamber;

a patrone chamber unit forming a patrone chamber;

a connecting member that has an aperture that is aligned with the lens barrel unit so that a beam from said lens barrel unit can pass through and guide rails defining a position of film to said aperture, connects said spool chamber unit and said patrone chamber unit, and has an approximately plate-like shape; and a reinforcing member spaced from said connecting member and is positioned nearer to a front end of said camera than said connecting member and reinforces connection of one of the connecting member and said spool chamber unit, and said connecting member and said patrone chamber unit; fastening means are provided for fixedly securing the connecting member to each of the spool chamber, patrone chamber and lens barrel units to form a unified camera body.

7. The camera body according to claim 6, wherein said lens barrel unit is connected to at least one of said connecting member and said reinforcing member.

8. The camera body according to claim 7, wherein a contact surface that is approximately orthogonal to an optical axis of a lens in said lens barrel unit is formed in at least one of said lens barrel unit and said connecting member and said reinforcing member that are connected to said lens barrel unit, the contact surfaces of the patrone chamber unit and the spool chamber unit and lens barrel unit all engage associated contacting surfaces of the connecting member.

9. The camera body according to claim 6, wherein a contact surface that is approximately orthogonal to an optical axis of a lens in said lens barrel unit is formed in each of said spool chamber unit, said patrone chamber unit, and said connecting member.

10. The camera body according to claim 6, wherein said reinforcing member has through-holes capable of passing through said lens barrel unit and is in a plate-like shape.

11. The camera body according to claim 6, wherein said reinforcing member, which extends not across but above and/or below the lens barrel, reinforces said spool chamber unit and said patrone chamber unit.

12. A camera body comprised of separate and independent components including:

a lens barrel unit;

a spool chamber unit forming a spool chamber;

a patrone chamber unit forming a patrone chamber;

a first connecting member that has an aperture aligned with the lens barrel unit so that a beam from said lens barrel unit can pass through and guide rails defining a position of film to said aperture, connects said spool chamber unit and said patrone chamber unit, and has an approximately plate-like shape;

a second connecting member spaced from said first connecting member and is positioned nearer to a front end of said camera than said first connecting member and connects said spool chamber unit and said patrone chamber unit; and a third connecting member that is connected to said spool chamber unit and said patrone chamber unit below said lens barrel unit; fastening means are provided for fixedly securing the second connecting member to each of the spool chamber, patrone chamber and lens barrel units to form a unified camera body.

13. The camera body according to claim 12, wherein said third connecting member lying in a plane that is approximately orthogonal to the aperture provided in said first connecting member.

14. The camera body according to claim 12, wherein said second connecting member has through-holes capable of passing through said lens barrel unit and has a plate-like shape.

15. A camera body comprised of separate and independent components including:

a lens barrel unit;

a spool chamber unit forming a spool chamber;

a patrone chamber unit forming a patrone chamber; and a connecting member that has an aperture that is aligned with the lens barrel unit so that a beam from said lens barrel unit can pass through, connects said spool chamber and said patrone chamber unit, and has an approximately plate-like shape; fastening means are provided for fixedly securing the connecting member to each of the spool chamber, patrone chamber and lens barrel units to form a unified camera body.

16. The camera body according to claim 15, wherein a contact surface that is approximately orthogonal to an optical axis of a lens in said lens barrel unit is formed in each of said spool chamber unit, said patrone chamber unit, and said connecting member, the contact surfaces of the patrone chamber unit and the spool chamber unit and lens barrel unit all engage associated contacting surfaces of the connecting member.

17. The camera body according to claim 15, further including a reinforcing member which extends not across but above and/or below the lens barrel and reinforces said spool chamber unit and said patrone chamber unit.

* * * * *

UNITED STATES PATENT AND TRADEMARK OFFICE
CERTIFICATE OF CORRECTION

Page 1 of 1

PATENT NO. : 6,023,592
DATED : February 8, 2000
INVENTOR(S) : Yokoyama et al

It is certified that error appears in the above-identified patent and that said Letters Patent is hereby corrected as shown below:

On title page in Inventors Section [75]

Line 2, after "Hino" insert --, Tokyo--.
Line 2, after "Hachioji" insert --, Tokyo--.
Line 2, after "Suzuki" insert --Setagaya,--.
Line 4, after "Tama" insert -- Tokyo--.

Column 2,
Line 42, delete "of " and insert therefor --at--.

Column 4,
Line 34, delete "coatacts" and insert therefor --contacts--.
Line 62, delete second occurrence of the word "to".

Signed and Sealed this

Tenth Day of July, 2001

Attest:

NICHOLAS P. GODICI
Attesting Officer
Acting Director of the United States Patent and Trademark Office